(12) United States Patent
Brito da Silva Correia

(10) Patent No.: US 9,260,674 B2
(45) Date of Patent: Feb. 16, 2016

(54) BIOFUEL CONTAINING FURANIC COMPOUNDS AND ALKOXY BENZENE COMPOUNDS AND THE PROCESS FOR OBTAINING THESE COMPOUNDS FROM SUGAR CANE BY HYDROLYSIS OF CELLULOSE, SUGARS AND LIGNIN IN IONIC LIQUIDS

(76) Inventor: Pedro Manuel Brito da Silva Correia, Estoril (PT)

( * ) Notice: Subject to any disclaimer, the term of this patent is extended or adjusted under 35 U.S.C. 154(b) by 81 days.

(21) Appl. No.: 13/616,421

(22) Filed: Sep. 14, 2012

(65) Prior Publication Data

US 2014/0075830 A1   Mar. 20, 2014

(51) Int. Cl.
| | | |
|---|---|---|
| *C10L 1/14* | (2006.01) | |
| *C10L 1/16* | (2006.01) | |
| *C10L 1/02* | (2006.01) | |

(52) U.S. Cl.
CPC .............. *C10L 1/023* (2013.01); *C10L 1/026* (2013.01); *C10L 2270/023* (2013.01); *C10L 2270/026* (2013.01)

(58) Field of Classification Search
CPC . C10L 2200/0469; Y02E 50/10; Y02E 50/13; Y02E 50/16; Y02E 50/30; Y02E 50/32
USPC .......................................................... 44/300
See application file for complete search history.

(56) References Cited

U.S. PATENT DOCUMENTS

| | | | |
|---|---|---|---|
| 3,037,028 A | 5/1962 | Green | |
| 3,715,365 A | 2/1973 | Schulze | |
| 5,424,417 A * | 6/1995 | Torget .................. | C08H 8/00 127/1 |
| 6,824,599 B2 | 11/2004 | Swatloski et al. | |
| 7,153,996 B2 * | 12/2006 | Fagan et al. ................... | 560/174 |
| 7,959,765 B2 * | 6/2011 | Argyropoulos ................ | 201/2.5 |
| 8,236,972 B2 * | 8/2012 | Hoskins et al. .............. | 549/488 |
| 8,247,581 B2 * | 8/2012 | Brito Da Silva Correia . | 549/417 |
| 8,324,376 B2 * | 12/2012 | Binder ................. | C07D 307/28 549/488 |
| 8,389,749 B2 * | 3/2013 | Dumesic et al. .............. | 549/489 |
| 8,480,764 B1 * | 7/2013 | da Silva Correia ............ | 44/352 |
| 8,497,105 B2 * | 7/2013 | Walther et al. ................ | 435/160 |
| 8,557,000 B2 * | 10/2013 | Agaskar .......................... | 44/307 |
| 8,624,043 B2 * | 1/2014 | Dumesic et al. .............. | 549/326 |
| 8,729,281 B2 * | 5/2014 | Zhang et al. .................. | 549/483 |
| 2005/0171374 A1 * | 8/2005 | Manzer ......................... | 560/190 |
| 2010/0312028 A1 * | 12/2010 | Olson et al. ................... | 585/242 |
| 2011/0275118 A1 * | 11/2011 | De Crecy ............. | C12P 7/6409 435/42 |
| 2011/0277378 A1 * | 11/2011 | Von Hebel et al. ............. | 44/436 |
| 2011/0302824 A1 * | 12/2011 | Von Hebel et al. ............. | 44/307 |
| 2012/0156742 A1 * | 6/2012 | Powell et al. ................. | 435/155 |
| 2012/0279496 A1 * | 11/2012 | Tao .......................... | C13K 1/02 127/29 |
| 2012/0283493 A1 * | 11/2012 | Olson et al. ................... | 585/242 |
| 2012/0330040 A1 * | 12/2012 | Parton et al. .................. | 549/489 |
| 2013/0217932 A1 * | 8/2013 | Seck ............................. | 585/251 |
| 2013/0237728 A1 * | 9/2013 | Lotero et al. ................. | 585/242 |
| 2013/0295629 A1 * | 11/2013 | Weider et al. ................ | 435/160 |
| 2013/0305594 A1 * | 11/2013 | Shuai et al. .................. | 44/330 |
| 2013/0330779 A1 * | 12/2013 | Zanghellini ..................... | 435/92 |
| 2014/0186903 A1 * | 7/2014 | Retsina et al. ................ | 435/126 |

FOREIGN PATENT DOCUMENTS

| | | | | |
|---|---|---|---|---|
| AU | WO 2010037178 A1 * | 4/2010 | ................ | C10L 1/02 |
| WO | WO 2011046779 A2 * | 4/2011 | ............. | C10G 11/00 |

OTHER PUBLICATIONS

U.S. Appl. No. 08/060,871, filed May 1993, Dickabian.

* cited by examiner

*Primary Examiner* — Nina Bhat
*Assistant Examiner* — Ming Cheung Po

(57) ABSTRACT

A biofuel consisting of a mixture of furanic compounds and polymethoxy benzene compounds which can be mixed with standard fuel consisting in hydrocarbons, and the process to obtain these compounds from sugar cane by converting cellulose, hemicellulose and sugars in furan derivatives and levullinic acid esters and by converting lignin in alkoxy benzene compounds by hydrolyzing the cellulose and lignin of sugar cane first in a mixture of N alkyl imidazolium chloride, hydrochloric acid 37% and an alcohol, dehydrating pentoses and hexoses so obtained from cellulose, stabilizing the aldehyde groups as acetal and stabilizing the phenolic hydroxyls obtained from lignin as alkyl ethers.

4 Claims, No Drawings

BIOFUEL CONTAINING FURANIC COMPOUNDS AND ALKOXY BENZENE COMPOUNDS AND THE PROCESS FOR OBTAINING THESE COMPOUNDS FROM SUGAR CANE BY HYDROLYSIS OF CELLULOSE, SUGARS AND LIGNIN IN IONIC LIQUIDS

FIELD OF INVENTION

Liquid biofuels from cellulose and lignin, ionic liquids, renewable energy, solvent extraction from ionic liquids

BACKGROUND OF THE INVENTION

The world production of cellulose and lignin on land is 60 billion ton per year and the stock of cellulose and lignin is 1 000 billion ton.

The world consumption of fossil fuels is 8 billion ton per year.

The food production in the world is 3 billion ton per year.

From these 3 numbers we conclude that, to take out from food, materials to produce bio ethanol or vegetable oils for biodiesel would not solve the problem of substituting fossil fuels, and would cause hunger.

On the other side, there are large surfaces of arable land, which are not cultivated or which produce plants not suitable for food. In these surfaces, the production of cellulose and lignin from trees or bush is possible. On the other side, cellulose and lignin contained in biomass is a side product of many food crops.

One of the crops which produce large quantities of cellulose and lignin per hectar and per year is sugar cane, which has an yield of 80 ton per hectar.

In one ton of sugar cane there are about 80 kg of sugar, which may be converted to 40 kg of bioethanol. Besides sugar there are 250 kg of cellulose and hemicellulose and 120 kg of lignin, which is presently not converted to liquid fuels.

The substitution of fossil fuels is also an important motivation to improve the process for producing biofuels, because of the carbon dioxide which they produce by burning. Although cellulose and lignin also produce carbon dioxide by burning, the same quantity of carbon dioxide was previously taken out of the atmosphere by photosynthesis to produce cellulose and lignin.

As a consequence, to convert cellulose and lignin into a liquid fuel is since decades a challenge for scientists, because the existing cars and trucks could drive with such a liquid biofuel without major changes in the motor.

The exhausting oil reserves and the political dependence on unstable countries producing oil is also a major problem today, which motivates the research of renewable alternatives.

In the literature as attach, there are research works on following reaction steps:

3. DETAILED DESCRIPTION OF THE INVENTION

In our U.S. Pat. No. 8,247,581 and U.S. Pat. No. 8,480,764 we described a process where cellulose hydrolyses to glucose in a solvent consisting of N-Alkyl imidazolium chloride (NAIC) mixed with a small quantity of hydrochloric acid and an alcohol. In this reaction medium glucose opens the pyran ring, the carbonyl function moves from position 1 to position 2, the ring is closed to a furan ring or partially remains open. The carbonyl group is stabilised as an acetal.

Although the use of an acetal to protect a carbonyl function is well known for those skilled in the art, the application of the acetal to this particular reaction conditions is not at all evident, as we are using an ionic liquid, the pH is under 3, and the conclusion that the carbonyl groups of glucose are stabilised by the acetal is also not evident.

In a second step we eliminate the water and the alcohol from the reaction mixture and add a small quantity of hydrochloric acid to catalyse the dehydration.

In a third step we add an alcohol again and heat to 60-90° C. in order to produce the acetal of HMF, the ester of levullinic acid and the alkoxy benzenes derived from the polyphenols existing in lignin.

In a fourth step we extracted from the NMIC mixture the acetal of HMF, the ester of levullinic acid and the alkoxy phenols with a cetone. The cetone extract was washed with water in order to further eliminate chloride ions.

After evaporation under vacuum of the solvent, we made GC-MS to identify the product.

We now found that using sugar cane directly instead of cellulose, as we made previously, there were 2 important improvements:

The cellulose contained in sugar cane had a crystallinity more favourable to hydrolysis than the cellulose which we used in previous trials, which was supplied from the cellulose and paper industry.

Lignin was also hydrolysed under the reaction conditions, producing alkoxy benzenes.

These finding are very important, because in this way we converted about 45% of the sugar cane in biofuel. Considering that 55% of sugar cane was water, this conversion is excellent and does not need any recycling of unreacted sugar cane.

We further found that after one month using the ionic liquid in a continuous process, it is easy to purify it from accumulating side products, just by neutralising the mixture with sodium hydroxide, falling out the sodium chloride and filtering.

N-methyl imidazole is extracted from the water phase with diethyl ether. The ether in the ether phase is separated by vacuum distillation and the vaporisation residue is N-Methyl imidazole.

The ionic liquid in case o N-methyl imidazolium chloride is obtained according to references 44 and 45 from inexpensive raw materials.

EXAMPLE

In a round bottom flask we stirred under reflux at 90° C.:

| | |
|---|---|
| N-methyl imidazolium chloride NMIC | 60 g |
| Sugar cane | 5 g |
| Hydrochloric acid 37% | 5 g |
| Methanol | 5 g |
| Chromium dichloride | 0.5 g |

After 3 hours, we added 30 ml of water to fall out any solids from sugar cane which did not react.

We filtered out the solids. The liquid filtrate was extracted with 3 portions of 50 ml of 3-pentanone. and heated at 110° C.

To eliminate residues of NMIC from the pentanone extract, we washed 3 times with 20 mlo of water.

The pentanone extract was then evaporated under vacuum at room temperature to eliminate 3 pentanone.

We made GC-MC of the residue and found:
Acetal of HMF
Alkyl esther of levullinic acid
3 main alkoxy benzenes
corresponding to 90% of the stechiometric conversion.

The mixture of these compounds has a boiling range of 150-200° C., just between gasoline and diesel oil. Previous scientific work presented in literature refer to individual steps of the conversion of lingo cellulosic materials into a mixture of compounds to be used as fuels:

Catalysis for conversion of glucose to HMF: 1, 3, 4, 5, 6, 9, 10, 11, 16, 19, 20, 26, 28, 30, 41,
Solution and hydrolysis of cellulose: 2, 7, 8, 15, 17, 18, 21, 22, 31, 33, 34, 35, 38
Stabilisation of HMF in the aldehyde function: 25, 29
Dehydration of fructose: 13, 14
Enzymatic conversion of cellulose and sugar: 37, 39
USP previously granted to Pedro Correia: 42, 43

The innovative aspects contained in this patent application are following:

Optimisation of the reaction conditions in order to make in the same reactor at the same time successive reactions, namely: dissolution of cellulose, hydrolysis of cellulose, hydrolysis of glucose to open the pyran ring, isomerisation of the linear form of glucose to the linear form of fructose, closing the linear form of fructose to a furan ring, dehydration of the cyclic form of fructose, stabilisation of HMF as acetal to be used directly as a diesel component.

Hydrolysis of lignin is the same reaction conditions as cellulose, which increases the yield of fuel components produced from sugar cane bagasse or corn stove Using the chromium dichloride as catalyst for isomerisation of glucose to fructose. This catalyst was already published in the literature as attached, however, we found that the dehydration of the pyran ring of glucose produces less stable molecules than the dehydration of the furanic ring of fructose. Therefore, the use of this isomerisation catalyst, under these reaction conditions, allows an important stabilisation of the final products of the reaction.

The use of the methanol, the optimised amount of hydrochloric acid and the chromium dichloride catalyst in the reaction medium allows a lower reaction temperature and therefore a higher selectivity than the use of higher temperatures. The use of a lower quantity of hydrochloric acid would need a higher reaction temperature and therefore a lower selectivity. A higher quantity of hydrochloric acid would cause a carbonisation of the glucose immediately after its formation by hydrolysis of cellulose.

We found that the butyl acetal of HMF but not the methyl acetal of HMF, are readily miscible with mineral diesel. The solution is stable.

The invention claimed is:

1. A process for producing lignocellulosic fuel comprising:
a) dissolving a lignocellulosic feedstock comprising lignin and cellulose selected from the group consisting of corn stover or waste from a sugar cane production process;
b) comminuting the corn stover or waste into a powder;
c) dissolving said powder in a solvent comprising N-Alkyl Imidazolium Chloride and Hydrochloric acid 37% to form a mixture with a pH of 2-2.5;
d) adding methanol and an isomerization catalyst to the mixture;
e) heating said mixture to 80-100° C. during 2 hours to form a product mixture with acetals of hydroxymethylfuran and alkoxy benzenes, wherein the heating causes the lignin and the cellulose and/or hemicellulose to be simultaneously hydrolyzed to
alkoxy benzenes produced from lignin
furanic compounds from the hydrolysis glucose obtained from the hydrolysis of cellulose and/or hemicellulose; isomerizing the glucose to form fructose; dehydrating the fructose into hydroxymethyl furaldehyde and the acetal of hydroxymethyl furaldehyde;
h) cooling and filtering the product mixture to collect a filtrate of the product mixture;
i) extracting the filtrate of the product mixture with pentanone and extracting the pentanone solution with water to remove any remaining N-methyl imidazolium chloride; and
j) removing the pentanone by evaporation and collecting the residue for use as a lignocellulosic fuel.

2. The process of claim 1, wherein the conversion of the lignin and cellulose and/or hemicellulose is greater than 90%.

3. The process of claim 1 wherein the process is performed by batch processing or continuously.

4. The lignocellulosic fuel product produced by the process of claim 1.

* * * * *